(12) United States Patent
Sonoda et al.

(10) Patent No.: US 6,267,040 B1
(45) Date of Patent: Jul. 31, 2001

(54) POWER STEERING DEVICE

(75) Inventors: Hirotetsu Sonoda; Tatsuya Fukushima, both of Saitama (JP)

(73) Assignee: Bosch Braking Systems Co., Ltd. (JP)

( * ) Notice: Subject to any disclaimer, the term of this patent is extended or adjusted under 35 U.S.C. 154(b) by 0 days.

(21) Appl. No.: 09/361,340

(22) Filed: Jul. 26, 1999

(30) Foreign Application Priority Data

Aug. 7, 1998 (JP) .................................................. 10-224262

(51) Int. Cl.$^7$ ...................................................... F15B 13/04
(52) U.S. Cl. .................................................. 91/420; 91/445
(58) Field of Search .............................. 91/420, 445, 446

(56) References Cited

FOREIGN PATENT DOCUMENTS

| | | |
|---|---|---|
| 58-139867 | 8/1983 | (JP) . |
| 61-12468 | 1/1986 | (JP) . |
| 62-43367 | 2/1987 | (JP) . |

*Primary Examiner*—Edward K. Look
*Assistant Examiner*—Michael Leslie
(74) *Attorney, Agent, or Firm*—Townsend and Townsend and Crew LLP; Kenneth R. Allen

(57) ABSTRACT

In a power steering device, a pump supplies a pressure fluid. A power cylinder has left and right chambers and is driven in accordance with a pressure difference between a pressure fluid supplied to the left chamber and that to the right chamber. A flow channel selector valve selectively switches a supply direction of the pressure fluid from the pump to the chambers of the power cylinder in response to steering operation of a steering wheel. Fluid paths connect the flow channel selector valve and the corresponding chambers of the power cylinder to each other. Variable restrictors are disposed in the fluid paths, respectively, to control flow rate of the pressure fluid from the power cylinder to the flow channel selector valve. Check valves are respectively connected to the fluid paths in parallel to the corresponding variable restrictors to prevent a flow of the pressure fluid from the power cylinder to the flow channel selector valve. First and second check valves are opened when the fluid pressure in the right and let fluid paths, respectively, is high.

7 Claims, 5 Drawing Sheets

POWER STEERING DEVICE

BACKGROUND OF THE INVENTION

The present invention relates to a power steering device for obtaining a power assist force (auxiliary steering force) by actuating a power cylinder in accordance with the steering operation of a steering wheel and, more particularly, to a power steering device having a steering damper for attenuating an impact generated upon input of a reverse force such as kickback from the steering wheel.

Generally, a hydraulic power steering device has a flow channel selector valve for switching the flow direction of a pressure oil to a power cylinder in response to the steering operation of a steering wheel. More specifically, the flow direction of the pressure oil is switched from the left to the right chamber of the power cylinder when leftward steering is to be performed, and from the left to right chamber of the power cylinder when rightward steering is to be performed, thereby obtaining a power assist force for operating the steering wheel.

In an automobile mounted with such a power steering device, various types of automobiles each in which the power steering device is provided with a steering damper are proposed in, e.g., Japanese Patent Laid-Open Nos. 58-139867, 61-12468, and 62-43367.

With a steering damper, during travel of an automobile, for example, a force that operates the steering wheel from the steering wheel side due to the unevenness and obstacles of the traveling road surface attenuates and moderates an impact generated when a reverse force serving as so-called kickback is input, so an abrupt impact is not transmitted to the steering wheel.

Among conventional steering dampers, the most general one has a restrictor or variable restrictor provided to each of pressure oil paths (right and left cylinder paths) connecting the flow channel selector valve of the power steering device and the right and left chambers, respectively, of the power cylinder. When a force such as kickback sent from the steering wheel acts on the power cylinder, the restrictor or variable restrictor resists against the flow of pressure oil reversely discharged from the power cylinder upon movement of the piston.

When, however, a forward force is input upon steering operation of the steering wheel, such a restrictor or variable restrictor resists against the flow of pressure oil from the pump and the return flow of pressure oil to the tank. Accordingly, the restrictor or variable restrictor does not respond quickly to the actuation of the power cylinder.

Therefore, Japanese Patent Laid-Open No. 62-43367 described above proposes a power steering device in which the restrictors, in the right and left cylinder paths, described above are formed of variable restrictor valves and check valves are connected in parallel to the respective variable restrictor valves. When a forward power is input upon steering operation, the check valve of the supply cylinder path is opened, so that the pressure oil can be sufficiently sent from the pump to the power cylinder.

In this prior art, the opening degree of each variable restrictor valve is variable and depends on the oscillation frequency in the oil chamber formed in the steering damper main body.

Even with the presence of the check valves, the return flow from the power cylinder cannot but pass through the variable restrictor valve. The variable restrictor valve and check valve serve as resistors to decrease the response speed of the power cylinder.

In the conventional steering damper described above, the variable restrictor valve for attenuating the impact generated upon input of a reverse force such as kickback from the steering wheel, and the variable restrictor valve for the forward force input upon steering operation of the steering force share the same return channel. Even when a sufficient amount of pressure oil is needed as in quick steering operation, supply of the pressure oil is sometimes interfered with.

More specifically, if the variable restrictor valves are provided considering seriously the performance for attenuating the impact generated upon input of a reverse force such as kickback, a sufficient return flow from the power cylinder cannot be obtained when a forward force is input accompanying steering operation, and a necessary amount of pressure oil cannot be supplied to the power cylinder.

If supply of the pressure oil is insufficient, operation of the power cylinder is delayed due to the insufficient pressure oil supply. The steering follow-up performance of the steering wheel accordingly becomes insufficient to cause so-called dragging in operation of the steering wheel especially in quick steering operation, making the steering operation unsmooth.

In the power steering device, in order to enable steering wheel operation free from dragging upon input of a forward force and to improve the response speed of the power cylinder, thereby improving the steering follow-up performance, the path diameters of the right and left cylinder paths must be increased. Then, however, a problem occurs when a reverse force such as kickback described above is input from the steering wheel. A countermeasure that can meet these contradictory demands is sought for.

SUMMARY OF THE INVENTION

It is an object of the present invention to provide a power steering device capable of moderating an impact generated upon input of a reverse force such as kickback from a steering device.

It is another object of the present invention to provide a power steering device in which the steering follow-up performance required upon input of a forward force accompanying the steering operation of the steering wheel is improved.

In order to achieve the above objects, according to the present invention, there is provided a power steering device comprising a pump for supplying a pressure fluid, a power cylinder having first and second chambers and driven in accordance with a pressure difference between a pressure fluid supplied to the first chamber and that to the second chamber, a flow channel selector valve for selectively switching a supply direction of the pressure fluid from the pump to the first and second chambers of the power cylinder in response to steering operation of a steering wheel, a first fluid path for connecting the flow channel selector valve and the first chamber of the power cylinder to each other, a second fluid path for connecting the flow channel selector valve and the second chamber of the power cylinder to each other, a first variable restrictor disposed in the first fluid path to control a flow rate of the pressure fluid from the power cylinder to the flow channel selector value, a second variable restrictor disposed in the second fluid path to control a flow rate of the pressure fluid from the power cylinder to the flow channel selector value, a first check valve connected to the first fluid path in parallel to the first variable restrictor to prevent a flow of the pressure fluid from the power cylinder to the flow channel selector valve, the first check valve being opened when the fluid pressure in the second fluid path is high, and a second check valve connected to the second fluid path in parallel to the second variable restrictor to prevent a flow of the pressure fluid from the power cylinder to the flow channel selector valve, the second check valve being opened when the fluid pressure in the first fluid path is high.

DESCRIPTION OF THE PREFERRED EMBODIMENT

The present invention will be described in detail with reference to the accompanying drawings.

Figure 1:
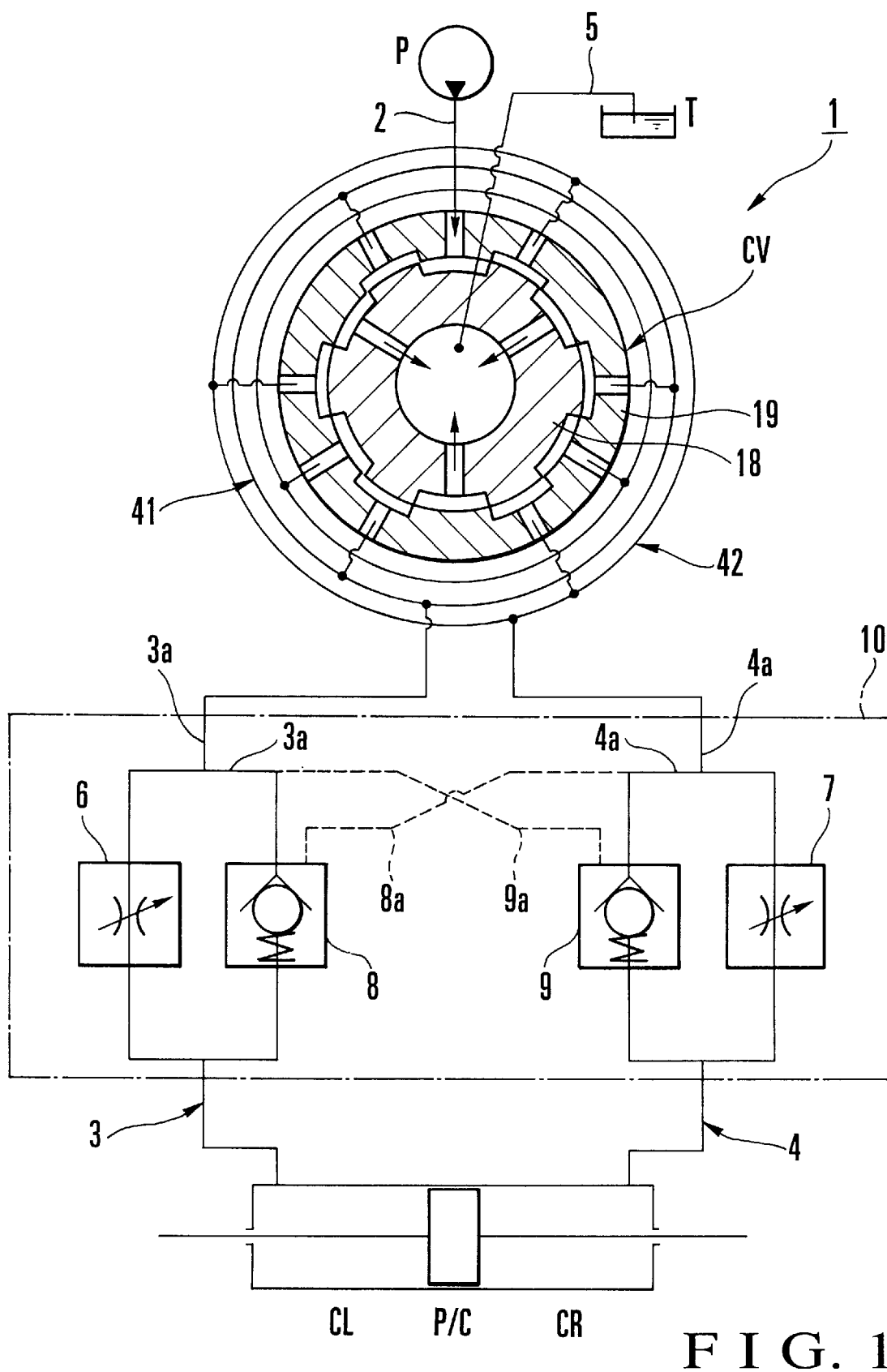
FIG. 1 is a schematic diagram showing a power steering device according to an embodiment of the present invention to explain its hydraulic circuit.

FIG. 1 shows the schematic arrangement of a hydraulic type power steering device according to an embodiment of the present invention. Referring to FIG. 1, the hydraulic circuit of a power steering device 1 is constituted by a pump P, a tank T, a flow channel selector valve CV, a power cylinder P/C, and a steering damper 10. The pump P supplies a pressure oil as a pressure fluid. The tank T stores the pressure oil and sends it back to the pump P. The flow channel selector valve CV selectively connects the pump P and tank T to two fluid paths 3a and 4a. The power cylinder P/C serves as a steering actuator which is driven in accordance with the pressure difference between the pressure oil sent from the flow channel selector valve CV through the fluid path 3a and that through the fluid path 4a. The steering damper 10 is disposed between the flow channel selector valve CV and power cylinder P/C. The flow channel selector valve CV is controlled to switch in accordance with the steering operation of a steering wheel (not shown) to feed the pressure oil from the pump P to the power cylinder P/C and return the pressure oil from the power cylinder P/C to the tank T.

The pressure oil supplied from the pump P is switched by the flow channel selector valve CV to a left chamber CL of the power cylinder P/C when leftward steering operation is to be performed, and to a right chamber CR of the power cylinder P/C when rightward steering operation is to be performed. The flow direction of the pressure oil is switched in this manner. As a result, a power assist force required for steering the steering wheel is obtained. An arrangement required for obtaining the power assist force is known and is shown in, e.g., Japanese Patent Laid-Open No. 62-43367, and a detailed description thereof will accordingly be omitted.

A feed path 2 extends from the pump P to the flow channel selector valve CV. A left cylinder path 3 connects the flow channel selector valve CV and the left chamber CL of the power cylinder P/C to each other. A right cylinder path 4 connects the flow channel selector valve CV and the right chamber CR of the power cylinder P/C to each other. A return path 5 extends from the flow channel selector valve CV to the tank T.

In this embodiment, the rotary flow channel selector valve CV composed of a rotor 18 and a sleeve 19 is used, as will be described later.

A pair of left and right variable restrictors 6 and 7 constituting the steering damper 10 are provided midway along the left and right cylinder paths 3 and 4, respectively. The variable restrictors 6 and 7 are closed against the flow of pressure oil from the flow channel selector valve CV to the power cylinder P/C, and are open against the flow of pressure oil from the power cylinder P/C to the flow channel selector valve CV. The opening areas of the variable restrictors 6 and 7 change in accordance with the flow rate of the oil flowing through them.

A pair of left and right pilot operation check valves 8 and 9 constituting the steering damper 10 are connected midway along the left and right cylinder paths 3 and 4, to be parallel to the variable restrictors 6 and 7. The pilot operation check valves 8 and 9 serve as check valves that interfere with the flow of the pressure oil from the power cylinder P/C to the flow channel selector valve CV. Pilot pressure paths 8a and 9a are connected to the pilot operation check valves 8 and 9, respectively, to guide the oil pressures in the other-side upstream paths 4a and 3a of the cylinder paths 4 and 3, respectively.

More specifically, the oil pressure of the upstream path 4a of the cylinder path 4 is sent to the pilot operation check valve 8 through the pilot pressure path 8a as a pilot pressure. When this pilot pressure is high, the pilot operation check valve 8 is opened. The oil pressure of the upstream path 3a of the cylinder path 3 is sent to the pilot operation check valve 9 through the pilot pressure path 9a as a pilot pressure. When this pilot pressure is high, the pilot operation check valve 9 is opened.

In this power steering device 1, for example, assume that when a forward force is input, the pressure oil flows from the right chamber CR to the left chamber CL of the power cylinder P/C. In this case, an impact generated upon input of a reverse force such as kickback from the steering wheel is attenuated and moderated by a flow channel resistance generated when the pressure oil from the power cylinder P/C, which is reversely discharged against the flow of the forward input force, flows through the variable restrictor 7 disposed in the supply cylinder path 4. At this time, a pilot pressure is not guided to the pilot operation check valve 9, connected in parallel to the variable restrictor 7, to open it, and the flow of pressure oil reversely discharged from the power cylinder P/C is blocked by closing the valve. When the flow rate of the pressure oil from the power cylinder P/C is large, the restrictor opening of the variable restrictor 7 increases; when small, it decreases.

Reversely, assume that that when a forward force is input, the pressure oil flows from the left chamber CL to the right chamber CR of the power cylinder P/C. In this case, an impact generated upon input of a reverse force such as kickback from the steering wheel is attenuated and moderated by a flow channel resistance generated when the pressure oil from the power cylinder P/C, which is reversely discharged against the flow of the forward input force, flows through the variable restrictor 6 disposed in the supply cylinder path 3. At this time, a pilot pressure is not guided to the pilot operation check valve 8, connected in parallel to the variable restrictor 6, to open it, and the flow of pressure oil reversely discharged from the power cylinder P/C is blocked by closing the valve. When the flow rate of the pressure oil from the power cylinder P/C is large, the restrictor opening of the variable restrictor 8 increases; when small, it decreases.

If the pressure oil flows from the right chamber CR to the left chamber CL of the power cylinder P/C upon input of a forward force, the pressure oil from the pump P through the flow channel selector valve CV opens the pilot operation check valve 9 disposed midway along the cylinder path 4 and is supplied to the power cylinder P/C. Furthermore, the oil pressure in the supply cylinder path 4 is supplied to the pilot operation check valve 8, disposed midway along the return cylinder path 3, through the pilot pressure path 8a as a pilot pressure, to open this pilot operation check valve 8. Hence, the pressure oil from the power cylinder P/C flows to the flow channel selector valve CV through the pilot operation check valve 8 to decrease the flow channel resistance, so that the return flow of the pressure oil from the power cylinder P/C can be assured. This improves the steering follow-up performance accompanying steering operation.

Reversely, if the pressure oil flows from the left chamber CL to the right chamber CR of the power cylinder P/C upon input of a forward force, the pressure oil from the pump P through the flow channel selector valve CV opens the pilot operation check valve 8 disposed midway along the cylinder path 3 and is supplied to the power cylinder P/C. Furthermore, the oil pressure of the supply cylinder path 3 is supplied to the pilot operation check valve 9, disposed midway along the return cylinder path 4, through the pilot pressure path 9a as a pilot pressure, to open this pilot operation check valve 9. Hence, the pressure oil from the power cylinder P/C flows to the flow channel selector valve CV through the pilot operation check valve 9 to decrease the flow channel resistance, so that the return flow of pressure oil from the power cylinder P/C can be assured. This improves the steering follow-up performance accompanying the steering operation.

Figure 2:
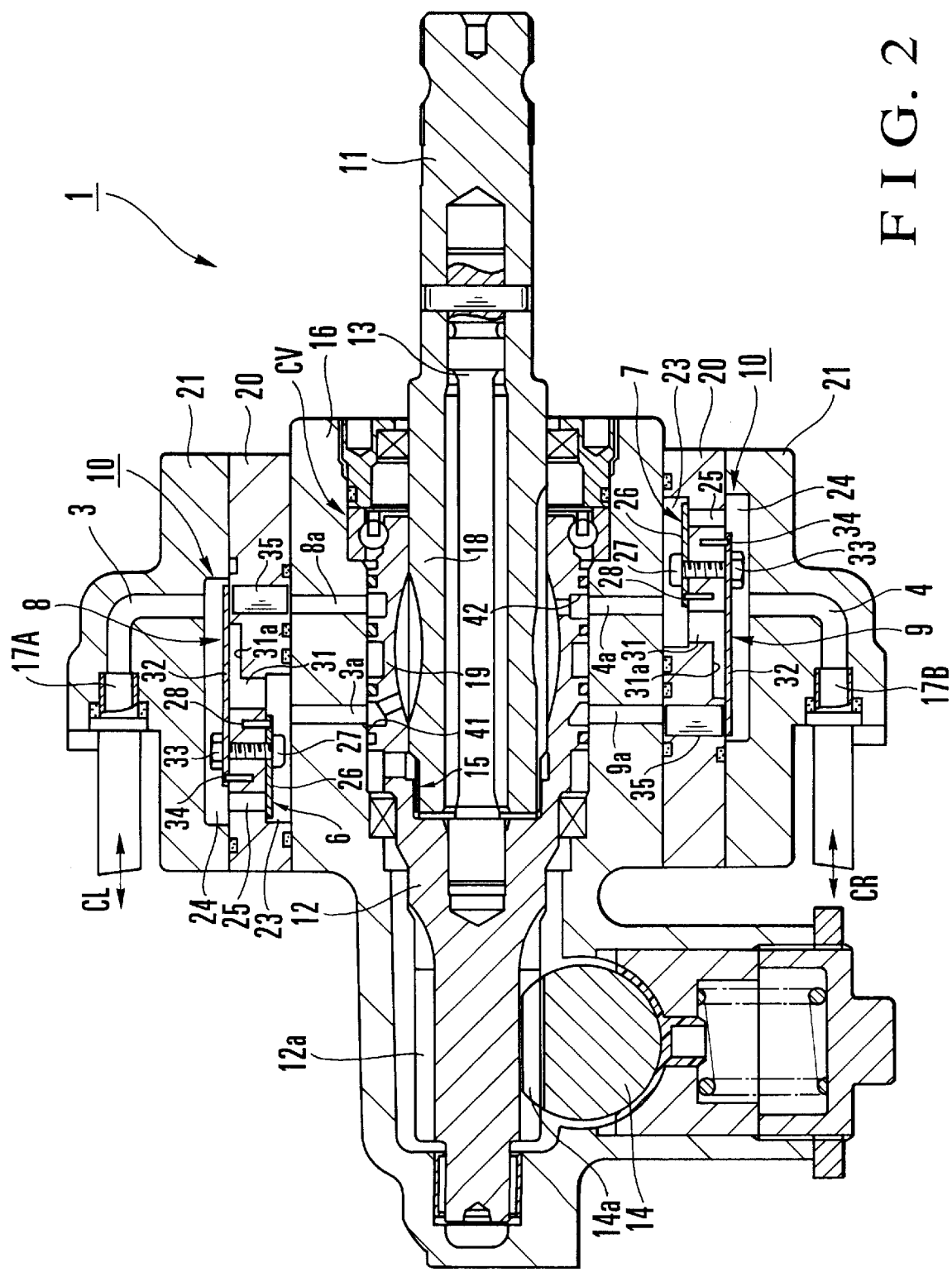
FIG. 2 is a sectional view of the main part of the main body of the power steering device according to the present invention.
Figure 3:
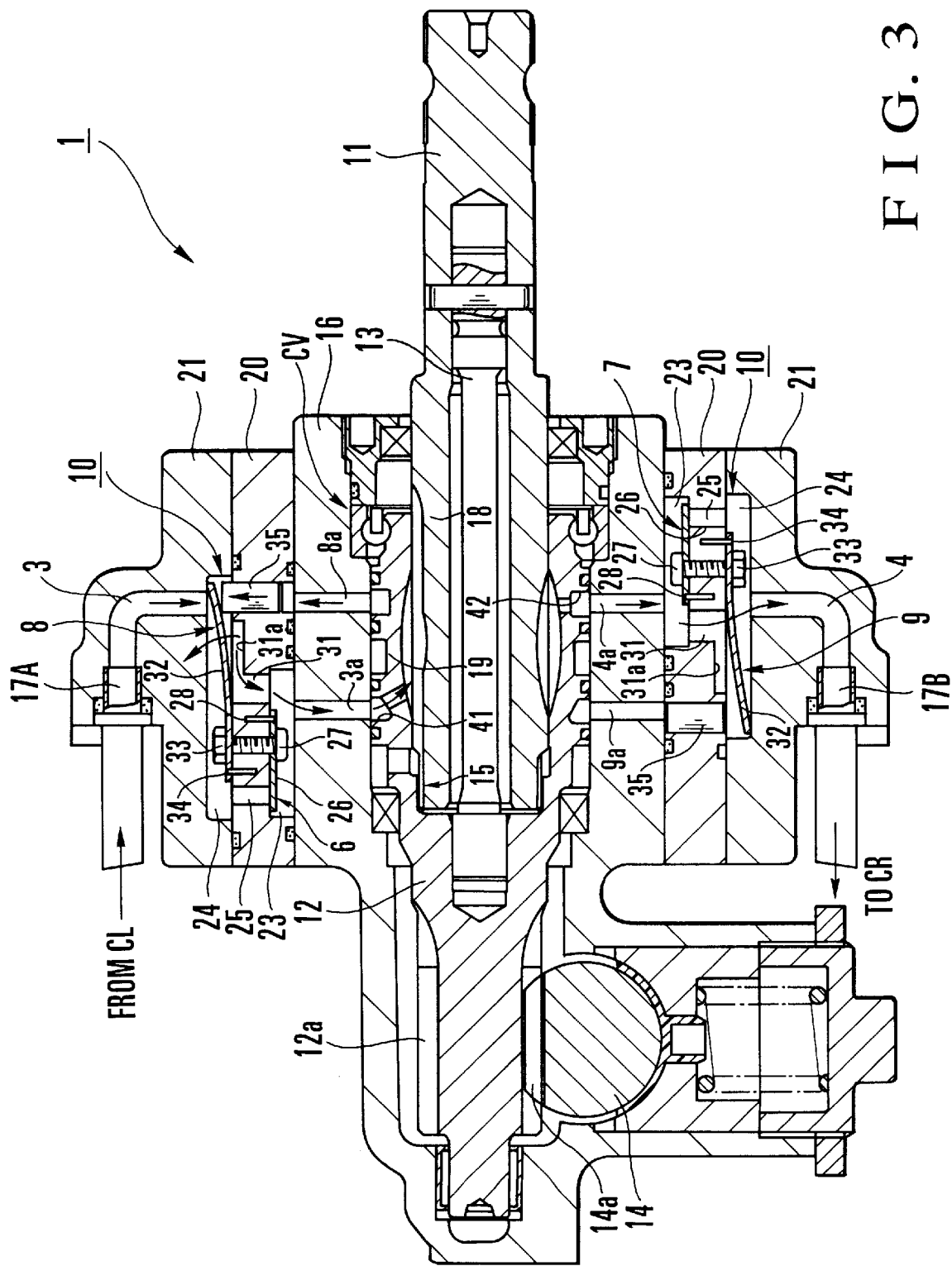
FIG. 3 is a view of the main body of the power steering device shown in FIG. 2 to explain a state wherein a forward force is input from the steering wheel.
Figure 4:
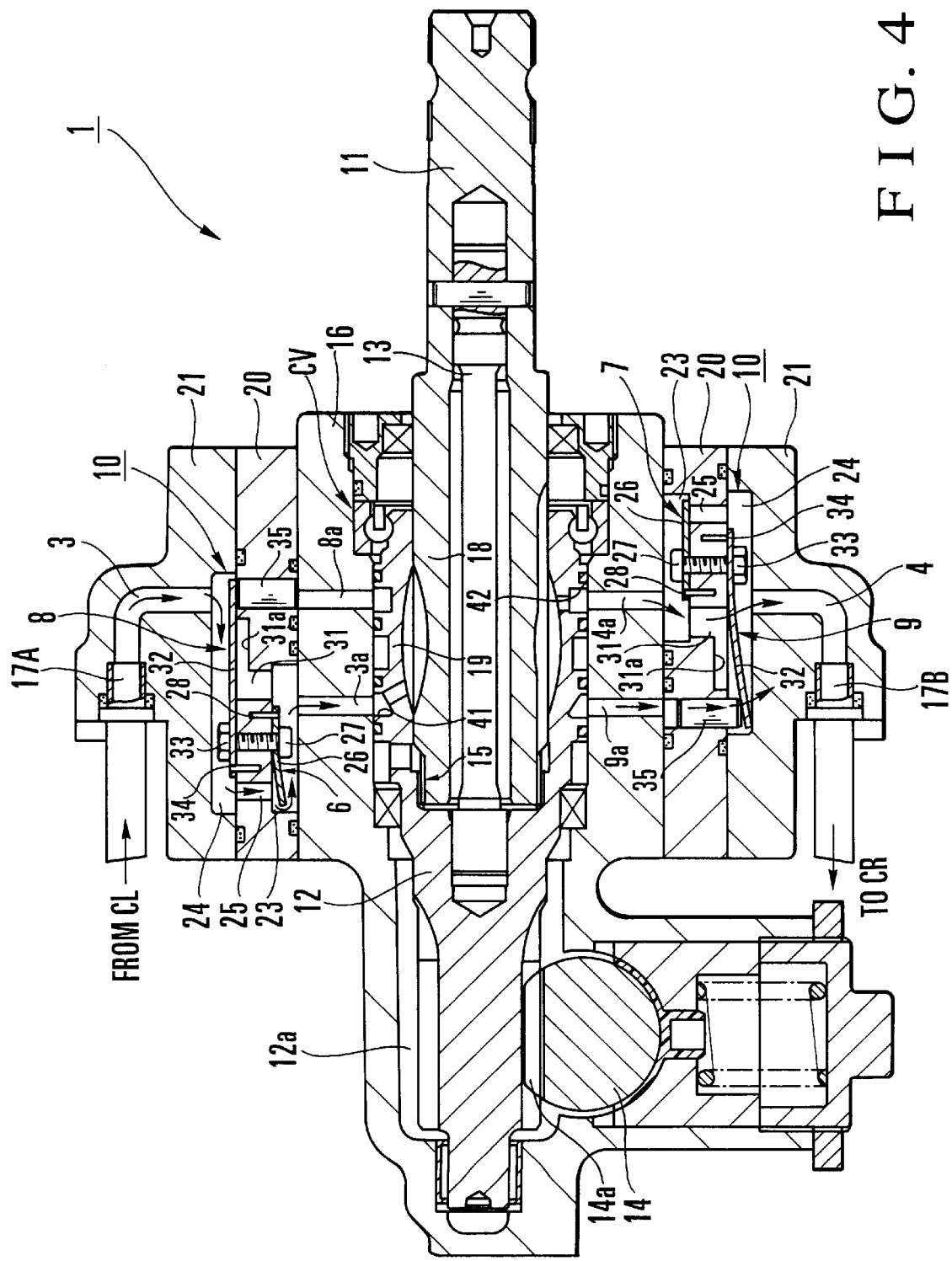
FIG. 4 is a view of the main body of the power steering device shown in FIG. 2 to explain a state wherein a reverse force is input from the steering wheel.
Figure 5A:
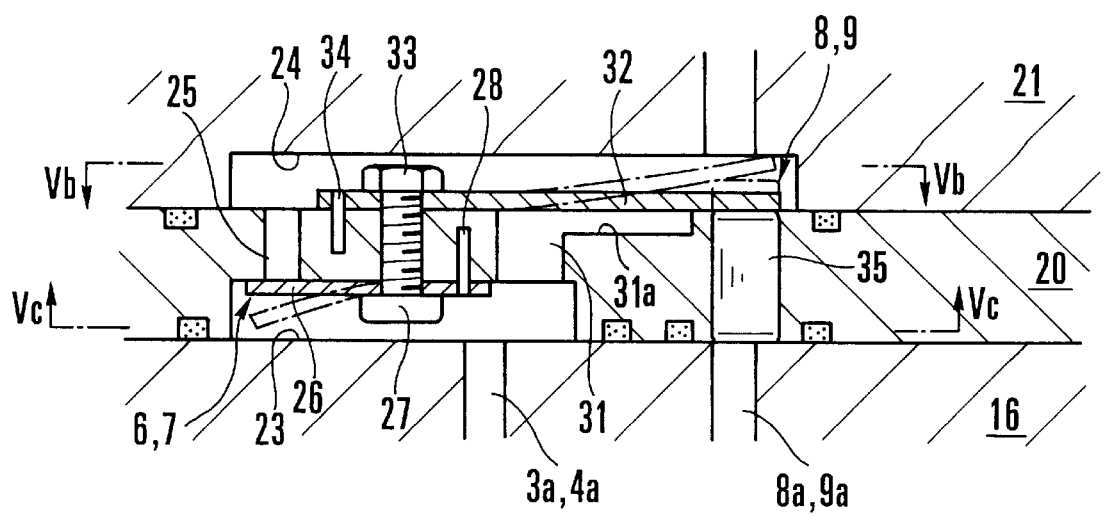
FIG. 5A is an enlarged sectional view showing the main part of the practical structure of a steering damper according to the present invention.
Figure 5B:
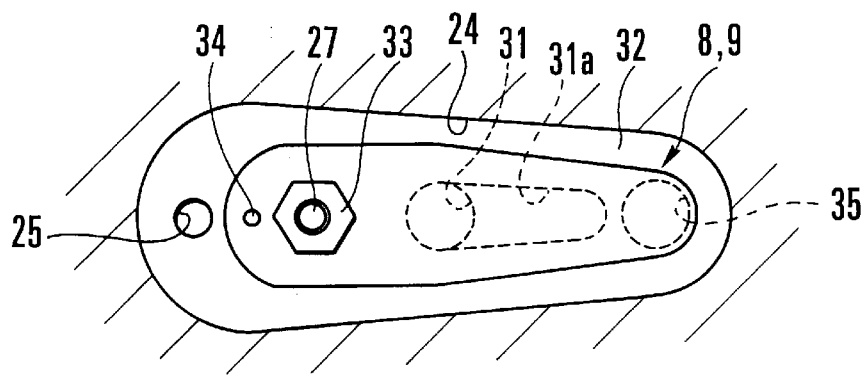
FIG. 5B is a sectional view taken along the line Vb—Vb of FIG. 5A.
Figure 5C:
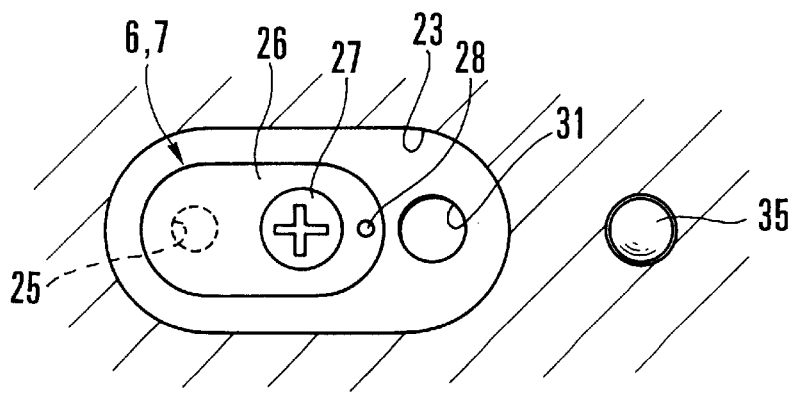
FIG. 5C is a sectional view taken along the line Vc—Vc of FIG. 5A.

FIGS. 2 to 4 show a case wherein the present invention is applied to a rack-pinion type power steering device. FIG. 2 shows a state wherein the power steering device is not operative, FIG. 3 shows a state wherein a forward force is input accompanying the steering operation of the steering wheel, and FIG. 4 shows a state wherein a reverse force such as kickback is input from the steering wheel.

In FIGS. 2 to 4, the power steering main body of the rack-pinion type power steering device is entirely denoted by reference numeral 1.

A stab shaft 11 serves as an input shaft connected to a steering wheel (not shown). A pinion shaft 12 is connected to the inner end (let end) of the stab shaft 11 through a torsion bar 13. The pinion shaft 12 is formed with a pinion 12a that engages with a rack 14a on a rack shaft 14 constituting a steering link mechanism (not shown). A safety spline portion 15 is formed between the two shafts 11 and 12. The safety spline portion 15 is composed of projections and recesses and serves as a failsafe mechanism which allows relative pivotal displacement within a predetermined angular range with torsion of the torsion bar 13.

A steering body 16 constitutes the power steering main body. The steering body 16 is composed of an integral structure including a valve housing for a rotary flow channel selector valve CV (to be described later) and a body portion that forms a cylindrical space for slidably holding the rack shaft 14. The shafts 11 and 12 are rotatably held by axial supports that directly receive bearings (to be described later) and the body 16. Oil seals are interposed at the appropriate positions of the shafts 11 and 12.

In this steering body 16, a rotor 18 and a sleeve 19 constituting the rotary flow channel selector valve CV are integrally connected to the inner ends of the shafts 11 and 12, respectively. As described above, when the rotor 18 and sleeve 19 are rotationally displaced relative to each other, flow channel selection between a pump P and a tank T, and left and right cylinders CL and CR of a power cylinder P/C is performed, as shown in FIG. 1.

In this embodiment, the rotor 18 is integrally formed on the stab shaft 11, and the sleeve 19 is integrally formed on the pinion shaft 12. The rotor 18 and sleeve 19 are assembled with each other through the torsion bar 13 to be rotatably displaceable relative to each other, and are incorporated in the valve incorporating space of the valve housing of the steering body 16.

The arrangement of the hydraulic circuit of the rotor 18 and sleeve 19 constituting the rotary flow channel selector valve CV, and the valve housing (body 16) is identical or similar to that that is widely known. More specifically, the outer and inner surfaces, respectively, of the rotor 18 and sleeve 19, which oppose and are in slidable contact with each other, are formed with a plurality of path grooves serving as valve grooves at predetermined gaps in the circumferential direction, and with a plurality of fluid supply and discharge holes at appropriate portions. When these path grooves and the like are selectively made to communicate with each other and disconnected from each other, the hydraulic circuit is switched as required.

An inlet port through which the pressure oil from the power cylinder P/C flows, a return port through which the pressure oil is returned to the tank T, and paths reaching the inlet and return ports are also formed in the steering body 16 incorporating the flow channel selector valve CV (described above), but are not illustrated.

Left and right output ports 17A and 17B are respectively connected to the left and right chambers CL and CR of the power cylinder P/C. When the flow channel selector valve CV described above is rotationally displaced upon steering operation, the hydraulic path between the left and right output ports 17A and 17B is arbitrarily connected or disconnected to control generation of the power assist force in the power cylinder P/C, as is also known widely.

A block 20 constituting a steering damper 10 identical to that described above, and a second block 21 having the output ports 17A and 17B are mounted on the outer surface of the steering body 16 having the structure described above, as shown in FIGS. 2 to 4 and FIGS. 5A, 5B, and 5C.

The steering body 16, and the blocks 20 and 21 form first and second empty chambers 23 and 24 midway along left and right cylinder paths 3 and 4.

The first empty chambers 23 are where variable restrictors 6 and 7 are formed. Each of the variable restrictors 6 and 7 is composed of a path hole 25 which opens to the first empty chamber 23, and a leaf spring 26 which openably covers the path hole 25.

Set screws 27 fix the corresponding leaf springs 26 to the block 20 by screwing. Reference numerals 28 denote rotation preventive pins 28.

With this arrangement, when the pressure oil from the output port 17A or 17B flows to the flow channel selector valve CV through the cylinder path 3 or 4, the swing end of the leaf spring 26 is warped in the opening direction in accordance with the flow rate of the pressure oil flowing through the corresponding path hole 25, and operates as the variable restrictor 6 or 7 to open/close the opening area of the flow channel.

The leaf spring 26 constituting the variable restrictor 6 or 7 merely opens/closes the open end of the corresponding path hole 25, and has a small pressure-receiving area and a high rigidity, so that the opening degree of the path hole 25 is small. Merely a restricting effect is accordingly obtained. In addition, this leaf spring 26 opposes a space, e.g., the first empty chamber 23, wider than the path hole 25. Therefore, the leaf spring 26 is opened even if the pressure oil from the path hole 25 has a low pressure. As a result, the leaf spring 26 can exhibit the function as the variable restrictor 6 or 7.

The steering damper 10 is provided with members constituting pilot operation check valves 8 and 9 by utilizing the second empty chamber 24.

More specifically, each of the pilot operation check valves 8 and 9 is formed of a path hole 31 formed in the block 20 to open to the second empty chamber 24, and a leaf spring 32 openably covering a wide open end 31a of the path hole 31. Nuts 33 are combined with the set screws 27 to fix the leaf springs 32. Reference numerals 34 denote rotation preventive pins.

Pilot plungers 35 capable of pushing the leaf springs 32 in the opening direction are movably provided in the block 20 as they are sealed by metal seals. Each of the pilot pressure paths 8a and 9a opposes the other end of the corresponding pilot plunger 35.

The pressure oils in the path portions 4a and 3a of the other-side cylinder paths 4 and 3 are respectively guided to the pilot pressure paths 8a and 9a through path grooves 42 and 41 of the flow channel selector valve CV described above.

With the steering damper 10 having the above arrangement, actions that take place upon input of the reverse and forward forces, which are described with reference to FIG. 1, and supply and return flows of the pressure oil from the pump P and to the tank T, respectively, can be obtained in required states.

With the pilot operation check valves 8 and 9 having the above structure, the leaf springs 32 oppose the wide open ends 31a of the path holes 31 to provide wide pressure-receiving areas against the pressure oil from the flow channel selector valve CV. Therefore, the leaf springs 32 can be opened and operated with a low pressure.

In actual design of the pilot operation check valves 8 and 9, the pilot plungers 35 may be preferably formed immediately near the flow channel selector valve CV so that the leaf springs 32 can be quickly opened by a low pilot pressure, and the leaf springs 32 may be preferably formed thin and long.

In this embodiment, the pilot pressure paths 8a and 9a for actuating the pilot plungers 35 are formed of path holes formed in the block 20. As the pilot pressure paths 8a and 9a are close to the flow channel selector valve CV, they are excellent in response speed of the plungers 35. For the purpose of protection of the leaf springs 32, appropriate stopper means (e.g., steps) may be formed between the pilot plungers 35 described above and the holding holes in the block 21.

The present invention is not limited to the structure explained in the embodiment described above, and the shapes, structures, and the like of the respective portions can be arbitrarily modified and changed, as a matter of course. For example, although the steering damper 10 is applied to the rack-pinion type power steering device 1 in the embodiment described above, the present invention is not limited to this, but can be applied to a power steering device 1 of another type.

In the embodiment described above, the variable restrictors 6 and 7 and the pilot operation check valves 8 and 9 constituting the steering damper 10 are integrally formed by using the blocks 20 and 21 mounted on the outer circumferential surface of the steering body 16. However, the present invention is not limited to this.

As the fluid pressure to be guided to the pilot operation check valves 8 and 9 described above through the pilot pressure paths 8a and 9a, the fluid pressure of any portion may be guided there as far as it is obtained in the other-side cylinder path.

In the steering body 16, the steering damper 10 disposed in the left and right cylinder paths 3 and 4 can be freely formed at an arbitrary position in the circumferential direction on the steering body 16, and can be disposed relatively close to each other. In the above embodiment described above, the variable restrictors 6 and 7 and the pilot operation check valves 8 and 9 are described by means of the leaf springs 26 and 32. However, the present invention is not limited to this.

As has been described above, according to the present invention, the impact generated upon input of a reverse force such as kickback from the steering wheel can be attenuated and moderated by the variable restrictors disposed in the first and second cylinder paths. The steering damper function can thus be effected.

According to the present invention, when a forward force is input upon steering operation of the steering wheel, the pressure fluid can be reliably supplied to the power cylinder through the flow channel selector valve by the first and second pilot operation check valves disposed in parallel to the variable restrictors of the first and second cylinder paths. The fluid pressure in the supply cylinder path is supplied to the pilot operation check valve in the return cylinder path as a pilot pressure to open it. The flow channel resistance is decreased to assure the return flow of the pressure fluid from the power cylinder, so that the power cylinder can be actuated appropriately. Therefore, the steering follow-up performance is not impaired.

According to the present invention, the surface of the leaf spring capable of opening/closing the path is utilized as a variable restrictor that can change the opening area in accordance with the transmission flow rate of the pressure fluid from the power cylinder to the flow channel selector valve. A smooth flow of the fluid at this portion can be obtained, and generation of fluid noise can be decreased.

According to the present invention, the leaf spring for opening/closing the open end of the path hole is formed as a valve body. The swing end of the leaf spring is pressed with the pilot plunger, thereby opening the pilot operation check valve. Hence, the structure and assembly are simple while obtaining a required operation.

What is claimed is:

1. A power steering device comprising:
   a pump for supplying a pressure fluid;
   a power cylinder having first and second chambers and driven in accordance with a pressure difference between a pressure fluid supplied to said first chamber and that to said second chamber;

a flow channel selector valve for selectively switching a supply direction of the pressure fluid from said pump to said first and second chambers of said power cylinder in response to steering operation of a steering wheel;

a first fluid path for connecting said flow channel selector valve and said first chamber of said power cylinder to each other;

a second fluid path for connecting said flow channel selector valve and said second chamber of said power cylinder to each other;

a first variable restrictor disposed in said first fluid path to control a flow rate of the pressure fluid from said power cylinder to said flow channel selector valve;

a second variable restrictor disposed in said second fluid path to control a flow rate of the pressure fluid from said power cylinder to said flow channel selector valve;

a first check valve connected to said first fluid path in parallel to said first variable restrictor to prevent a flow of the pressure fluid from said power cylinder to said flow channel selector valve; and a second check valve connected to said second fluid path in parallel to said second variable restrictor to prevent a flow of the pressure fluid from said power cylinder to said flow channel selector valve.

2. A device according to claim 1, wherein said first and second variable restrictor are closed against a flow of the pressure fluid from said power cylinder to said flow channel selector valve, and opened to a flow of the pressure fluid from said flow channel selector valve to said power cylinder so as to change opening areas thereof in accordance with a flow rate of the pressure fluid from said power cylinder to said flow channel selector valve.

3. A device according to claim 2, wherein said first and second variable restrictors are respectively constituted by path holes that open to the chamber formed in part of said first and second fluid paths, and leaf springs openably covering openings of said path holes.

4. A device according to claim 1, wherein said first and second check valves are opened against a flow of the pressure fluid from said flow channel selector valve to said power cylinder, and opened against a flow of the pressure fluid from said power cylinder to said flow channel selector valve when a pressure of the pressure fluid in said second and first fluid paths is high.

5. A device according to claim 1, wherein said first and second check valves are respectively constituted by path holes that open to the chamber formed in said first fluid paths, and leaf springs openably covering openings of said path holes.

6. A device according to claim 5, further comprising plungers which push up said leaf springs to open the openings of said path holes when the fluid pressure in said first and second fluid paths is high.

7. A device according to claim 1, wherein said first and second variable restrictors and said first and second check valves constitute a steering damper.

* * * * *